(12) United States Patent
Nishigaki

(10) Patent No.: US 11,570,319 B2
(45) Date of Patent: Jan. 31, 2023

(54) IMAGE FORMING APPARATUS AND CONTROL METHOD FOR IMAGE FORMING APPARATUS

(71) Applicant: TOSHIBA TEC KABUSHIKI KAISHA, Tokyo (JP)

(72) Inventor: Takuya Nishigaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/707,806

(22) Filed: Mar. 29, 2022

(65) Prior Publication Data

US 2022/0224799 A1    Jul. 14, 2022

Related U.S. Application Data

(63) Continuation of application No. 16/993,013, filed on Aug. 13, 2020, now abandoned.

(30) Foreign Application Priority Data

Mar. 25, 2020    (JP) .............................. JP2020-053950

(51) Int. Cl.
  *G06F 15/00*    (2006.01)
  *H04N 1/00*    (2006.01)
  *H04N 1/44*    (2006.01)

(52) U.S. Cl.
  CPC ..... *H04N 1/00472* (2013.01); *H04N 1/00424* (2013.01); *H04N 1/00427* (2013.01); *H04N 1/4433* (2013.01)

(58) Field of Classification Search
  CPC ........... H04N 1/00472; H04N 1/00424; H04N 1/00427; H04N 1/4433
  USPC ....................................................... 358/1.15
  See application file for complete search history.

(56) References Cited

U.S. PATENT DOCUMENTS

2008/0184156 A1    7/2008    Sato
2015/0172487 A1    6/2015    Kirihara et al.

FOREIGN PATENT DOCUMENTS

JP        2009-033263 A    2/2009
JP        2010-244317 A    10/2010

OTHER PUBLICATIONS

U..S Office Action on U.S. Appl. No. 16/993,013 dated Dec. 29, 2021.
U.S. Office Action on U.S. Appl. No. 16/993,013 dated Jul. 27, 2021.

*Primary Examiner* — Mark R Milia

(74) *Attorney, Agent, or Firm* — Foley & Lardner LLP

(57) ABSTRACT

An image forming apparatus for a display that is configured to display at least one of a foreground or a background includes a display control unit and a determining unit. The display control unit configured to cause the display to display, in the foreground, a first screen corresponding to a first input by a user. The display control unit is also configured to cause the display to display, in the background, a second screen corresponding to a home screen of the user. The display control unit is also configured to cause in response to receiving a clear input from the user, the display to display, in the foreground, the second screen and display, in the background, the second screen separately from the second screen displayed in the foreground. The determining unit is configured to determine a first duration that a third screen is displayed in the foreground.

20 Claims, 3 Drawing Sheets

IMAGE FORMING APPARATUS AND CONTROL METHOD FOR IMAGE FORMING APPARATUS

CROSS-REFERENCE TO RELATED APPLICATIONS

This application is a continuation of U.S. patent application Ser. No. 16/993,013, filed Aug. 13, 2020, which is based upon and claims the benefit of priority from Japanese Patent Application No. 2020-053950, filed Mar. 25, 2020, the entire contents of which are incorporated herein by reference.

FIELD

Embodiments described herein relate generally to an image forming apparatus and a control method for the image forming apparatus.

BACKGROUND

An image forming apparatus is often shared by a plurality of users. Accordingly, the image forming apparatus needs to prevent operation information of a certain user from being seen from the other users. The image forming apparatus clears the operation information of the certain user to prevent the operation information from being seen from the other users. In this case, the image forming apparatus returns a screen displayed on a display to a home screen. However, the image forming apparatus takes time for processing of home screen generation for displaying the home screen on the display. Related art is described in, for example, JP-A-2010-244317.

DETAILED DESCRIPTION

Figure 1:
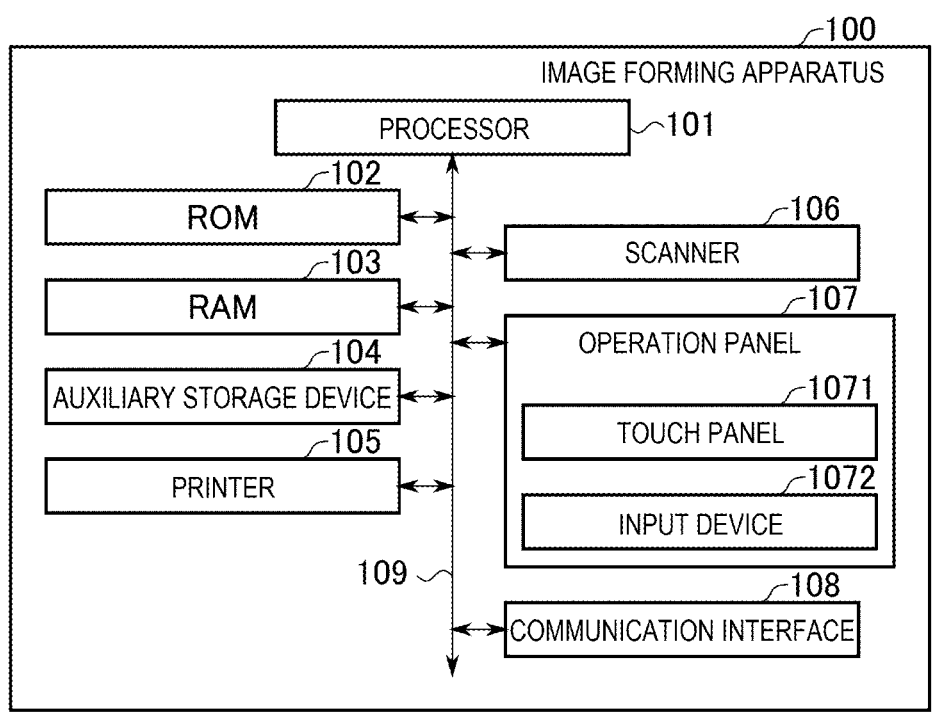
FIG. 1 is a block diagram illustrating an example of a main part configuration of an image forming apparatus according to an embodiment.

Embodiments described herein may provide an image forming apparatus and a control method for the image forming apparatus that can make a time required for display of a home screen shorter than before. In general, according to an embodiment, an image forming apparatus includes a display control unit. The display control unit controls (e.g., causes, instructs, etc.) a display unit to display, in a foreground, a first screen corresponding to an input by a user and display, in a background, a second screen used as a home screen. If clearing operation information of the user, the display control unit controls the display unit to display, in the foreground, the second screen displayed in the background and display, in the background, the second screen separately from the second screen displayed in the foreground.

An image forming apparatus according to an embodiment is explained below with reference to the drawings. In the drawings referred to in the following explanation of the embodiment, scales of units are sometimes changed as appropriate. In the drawings referred to in the following explanation of the embodiment, components are sometimes omitted for explanation. In the drawings and this specification, the same reference numerals and signs denote the same elements.

FIG. 1 is a block diagram illustrating an example of a main part configuration of an image forming apparatus 100 according to the embodiment.

The image forming apparatus 100 is, for example, a multifunction peripheral (MFP), a copying machine, a printer, or a facsimile machine. In the following explanation, it is assumed that the image forming apparatus 100 is an MFP. The image forming apparatus 100 includes, for example, a printing function, a scanning function, a copying function, and a facsimile function. The printing function is a function of forming an image on an image forming medium P or the like using a recording material such as toner. The image forming medium P is, for example, sheet-like paper. The scanning function is a function of reading an image from an original document on which the image is formed. The copying function is a function of printing, using a printing function, on the image forming medium P, the image read from the original document or the like using the scanning function. The image forming apparatus 100 includes, as an example, a processor 101, a read-only memory (ROM) 102, a random-access memory (RAM) 103, an auxiliary storage device 104, a printer 105, a scanner 106, an operation panel 107, and a communication interface 108. A bus 109 or the like connects (e.g., via electronic communication, etc.) these units.

The processor 101 is equivalent to a central part of a computer that performs processing such as arithmetic operations and control necessary for the operation of the image forming apparatus 100. The processor 101 controls the units in order to realize various functions of the image forming apparatus 100 based on programs such a firmware, a system software, and an application software stored in the ROM 102, the auxiliary storage device 104, or the like. The processor 101 executes processing explained below based on the programs. A part or all of the programs may be incorporated in a circuit of the processor 101. The processor 101 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 101 is a combination of a plurality of devices among these devices.

The ROM 102 is equivalent to a main storage device of the computer including the processor 101 as the central part. The ROM 102 is a nonvolatile memory exclusively used for readout of data. The ROM 102 stores, for example, the firmware among the programs described above. The ROM 102 also stores data used by the processor 101 in performing various kinds of processing.

The RAM 103 is equivalent to the main storage device of the computer including the processor 101 as the central part. The RAM 103 is a memory used for reading and writing of data. The RAM 103 is used as, for example, a work area that stores data temporarily used by the processor 101 in performing the various kinds of processing. The RAM 103 is typically a volatile memory.

The auxiliary storage device 104 is equivalent to an auxiliary storage device of the computer including the processor 101 as the central part. The auxiliary storage device 104 is, for example, an electric erasable programmable read-only memory (EEPROM), a hard disk drive (HDD), or a flash memory. The auxiliary storage device 104 stores, for example, the system software and the application software among the programs described above. The auxiliary storage device 104 stores data used by the processor 101 in performing the various kinds of processing, data generated by the processing in the processor 101, various setting values, and the like. The image forming apparatus 100 may include, as the auxiliary storage device 104, an interface into which a storage medium such as a memory card or a universal serial bus (USB) memory is insertable. The interface reads information from and writes information in the storage medium. The auxiliary storage device 104 stores data necessary for generation of screens to be displayed on a touch panel 1071.

The auxiliary storage device 104 correlates various kinds of information for each of registered users with a user identifier (ID) and stores the information. The user ID is identification information uniquely imparted to each of a plurality of users registered in (e.g., associated with, etc.) the image forming apparatus 100.

The printer 105 forms an image using toner, ink, or the like to print the image on the image forming medium P. The printer 105 includes, for example, a printer of an electrophotographic system (e.g., laser system, etc.), an inkjet type, or another type and performs printing with the printer.

The scanner 106 reads an image from an original document. The scanner 106 is an optical reduction type including an imaging element such as a charge-coupled device (CCD) image sensor. Alternatively, the scanner 106 is a contact image sensor (CIS) type including an imaging element such as a complementary metal-oxide-semiconductor (CMOS) image sensor. Alternatively, the scanner 106 may be other types. The operation panel 107 includes a man-machine interface that performs input and output between the image forming apparatus 100 and an operator of the image forming apparatus 100 (hereinafter simply referred to as the "operator"). The operation panel 107 includes, for example, buttons and a touch panel to be operated by the operator. The touch panel is configured by stacking, for example, a display such as a liquid crystal display or an organic electroluminescence (EL) display and a pointing device by touch input. Therefore, the buttons and the touch panel function as an input device that receives operation by the operator. The display included in the touch panel functions as a display device that notifies various kinds of information to the operator. The operation panel 107 includes, as an example, a touch panel 1071 and an input device 1072.

The touch panel 1071 is configured by stacking, for example, a display such as a liquid crystal display or an organic EL display and a pointing device by touch input. The display included in the touch panel 1071 functions as a display device that displays a screen for notifying various kinds of information to the operator. The touch panel 1071 functions as an input device that receives touch operation by the operator.

The touch panel 1071 or the display included in the touch panel 1071 is an example of a display unit.

The input device 1072 receives operation by the operator. The input device 1072 is, for example, a keyboard, a keypad, or a touch pad.

The communication interface 108 is an interface for the image forming apparatus 100 to communicate via a network such as the Internet or a local area network (LAN).

The bus 109 includes a control bus, an address bus, and a data bus and transmits signals exchanged by the units of the image forming apparatus 100.

Figure 2:
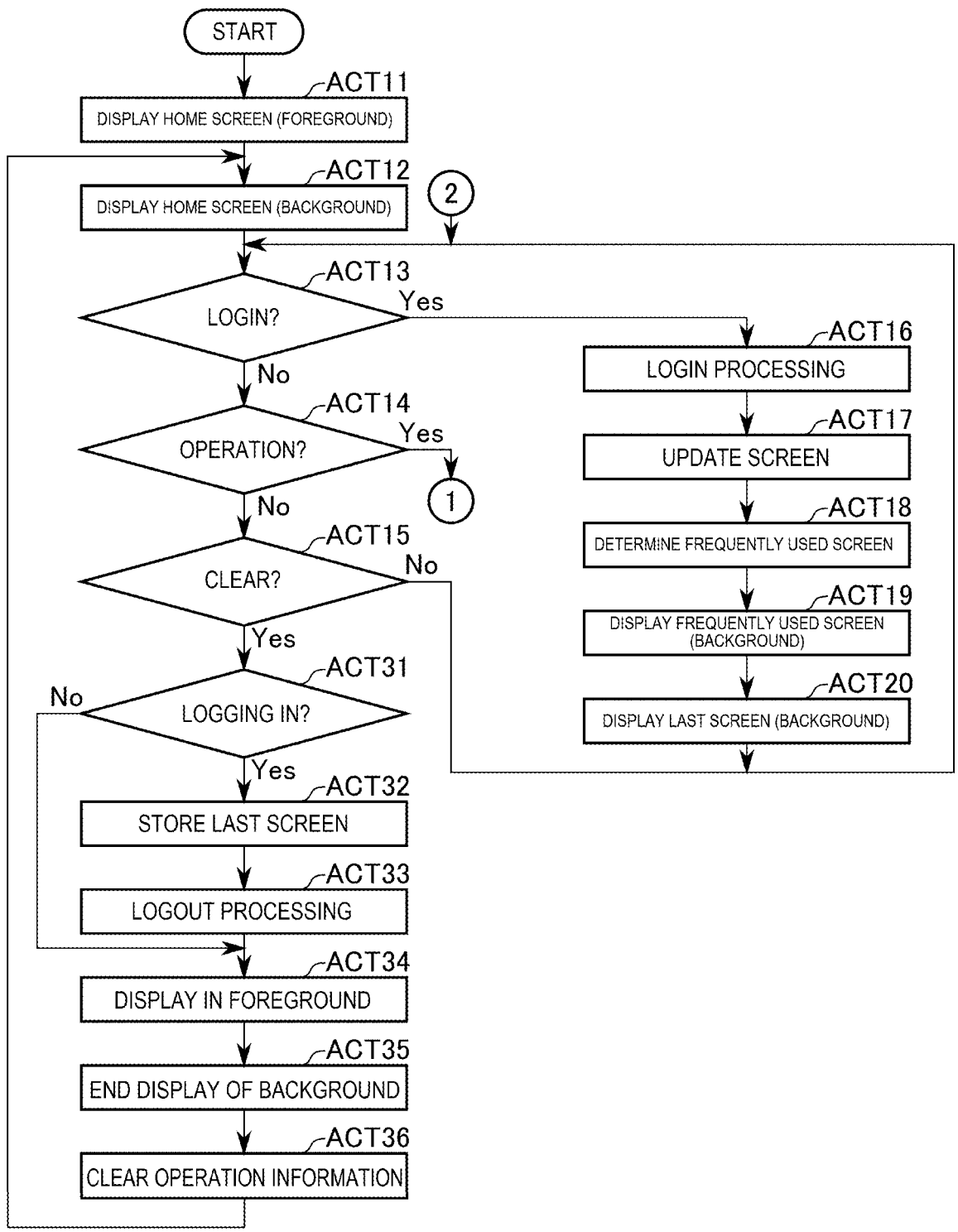
FIGS. 2 and 3 are a flowchart illustrating an example of processing by the processor illustrated in FIG. 1.
Figure 3:
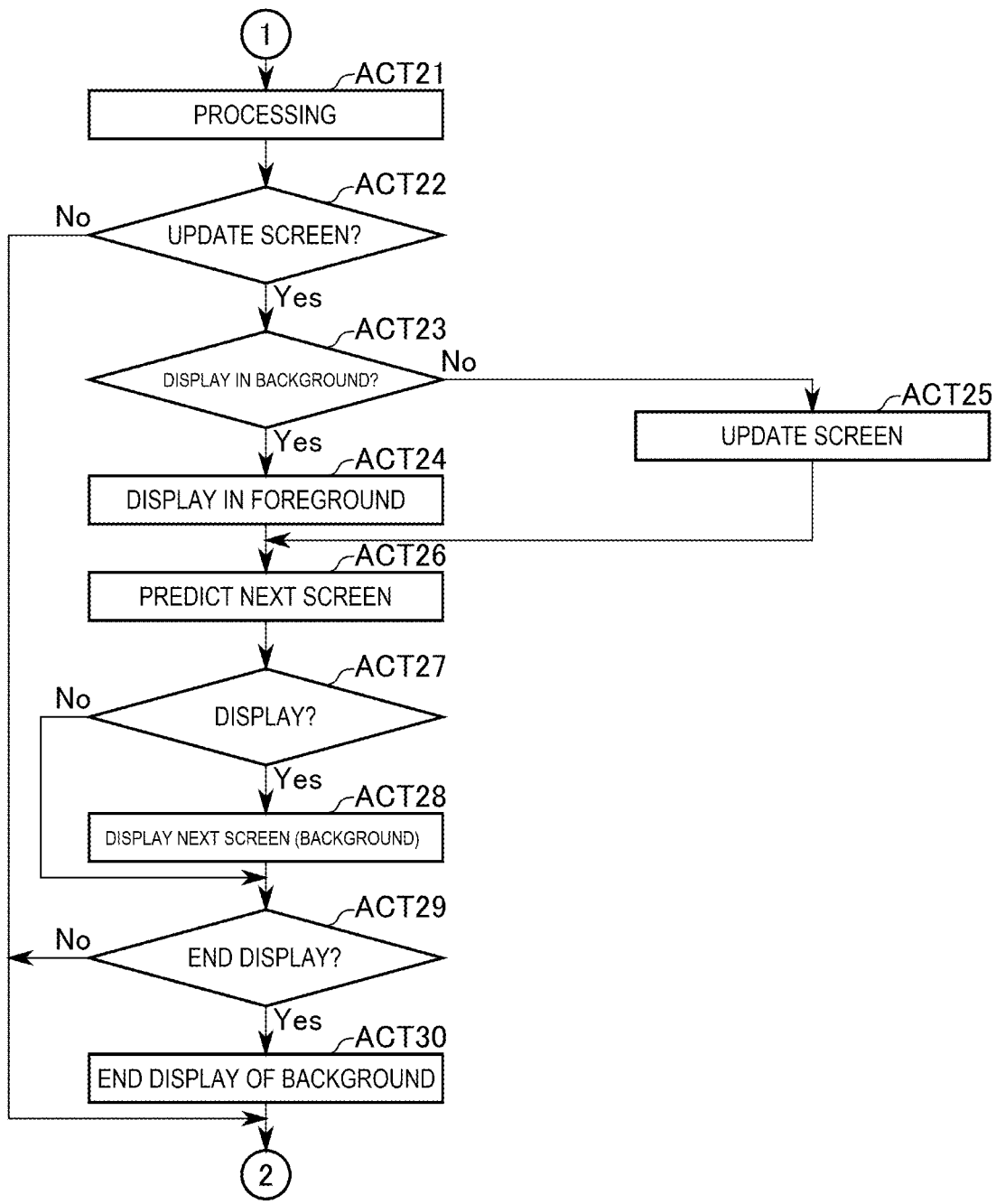

The operation of the image forming apparatus 100 according to the embodiment is explained below with reference to FIGS. 2 and 3 and the like. Content of processing in the following operation explanation is an example. Various kinds of processing capable of obtaining the same result can be used as appropriate. FIGS. 2 and 3 are flowcharts illustrating an example of processing by the processor 101 of the image forming apparatus 100. For example, the processor 101 executes the processing illustrated in FIG. 2 based on a program stored in the ROM 102, the auxiliary storage device 104, or the like.

For example, the processor 101 starts the processing illustrated in FIGS. 2 and 3 according to a start of the image forming apparatus 100.

In ACT 11 in FIG. 2, the processor 101 generates (e.g., renders, etc.) a home screen using home screen data necessary for generating the home screen. The processor 101 controls the touch panel 1071 and causes the touch panel 1071 to display the generated home screen. The home screen is, for example, a screen (e.g., a default screen, etc.) displayed on the touch panel 1071 first if the operator operates the image forming apparatus 100 using the operation panel 107. For example, the home screen includes buttons for instructing the image forming apparatus 100 to execute various functions or various applications and various kinds of information to be notified to the operator and the like.

In ACT 12, the processor 101 generates a home screen using home screen data. However, the processor 101 does not display the generated home screen on the touch panel 1071.

As explained above, the processor 101 generates two home screens and displays one of the home screens on the touch panel 1071 according to the processing in ACT 11 and ACT 12. The processor 101 does not display the other home screen on the touch panel 1071. In this way, a screen displayed on the touch panel 1071 is an example of a screen displayed in a foreground. A screen generated by the processor 101 and not displayed on the touch panel 1071 is an example of a screen displayed in a background. The screen displayed in the foreground typically displays the same content as the content displayed by the image forming apparatus in the past (e.g., previously, etc.). On the other hand, the screen displayed in the background is generated to, for example, increase speed of update of the screen displayed on the touch panel 1071. The update indicates changing the screen displayed on the touch panel 1071 to a different screen.

The home screen is an example of a second screen. Consequently, the processor 101 performs the processing in ACT 12 to function as an example of a display control unit that controls the touch panel 1071 to display, in the background, the second screen used as the home screen.

In ACT 13, the processor 101 determines whether login operation is performed. An operator desiring to log in to the image forming apparatus 100 performs, for example, login operation explained below. That is, for example, the operator operates the operation panel 107 or the like and inputs a user ID, a password, and the like. Alternatively, the operator causes a card reader included in the image forming apparatus 100 to read an ID card carried by the operator. The ID card stores information necessary for login such as a user ID. Alternatively, the operator may perform operation for login through biometric authentication. The image forming apparatus 100 may perform the biometric authentication according to approach of the operator within a fixed distance or more from the image forming apparatus 100. If the login operation is not performed, the processor 101 determines No in ACT 13 and proceeds to ACT 14.

In ACT 14, the processor 101 determines whether an input other than the login operation and clear operation is performed. This input may be an operation input performed using the operation panel 107 or the like, an input of information such as a command transmitted from another computer through a network, and the like. If an input other than the login operation and the clear operation is not performed, the processor 101 determines No in ACT 14 and proceeds to ACT 15. The clear operation is explained below.

In ACT 15, the processor 101 determines whether to clear operation information. For example, the processor 101 clears the operation information if the processor 101 determines that the operation by the operator has ended and the operator is returning to the home screen. The processor 101 determines, for example, according to a clear input, to clear the operation information. The clear input is an input for instructing the image forming apparatus 100 to clear the operation information. In the embodiment, logout operation for releasing a login state to log out is a kind of the clear input. The processor 101 determines, according to absence of an operation for a fixed time or more, that is, a timeout, to clear the operation information. The processor 101 may determine, according to separation of the operator from the image forming apparatus 100 by a fixed distance or more, to clear the operation information. If not determining to clear the operation information, the processor 101 determines No in ACT 15 and returns to ACT 13. In this way, the processor 101 comes into a waiting state for repeating ACT 13 to ACT 15 until an operation is performed using the operation panel 107.

If the login operation is performed in the waiting state in ACT 13 to ACT 15, the processor 101 determines Yes in ACT 13 and proceeds to ACT 16.

In ACT 16, the processor 101 performs login processing relating to login. In the login processing, the processor 101 performs authentication such as password authentication, card authentication, or biometric authentication. If succeeding in the authentication, the processor 101 stores a user ID and the like of a logging-in operator (e.g., a login user, etc.) such that the operator can be specified. If succeeding in the authentication, the image forming apparatus 100 comes into a login state in which the login user is logging in.

In FIG. 2, only a flow in the case of succeeding in the authentication relating to the login is illustrated. Actually, if failing in the authentication, for example, the image forming apparatus 100 returns to the waiting state in ACT 13 to ACT 15.

In ACT 17, for example, the processor 101 updates the screen displayed in the foreground to a custom screen corresponding to the login user according to necessity (e.g., a preference of the login user that is stored in the ROM 102 or the RAM 103). For example, the home screen can be customized for each of registered users. The custom screen indicates the home screen customized in this way. In ACT 18, the processor 101 determines a screen often used by the login user. The screen often used by the user is hereinafter referred to as a "frequently used screen."

For example, the processor 101 stores, for each of the registered users, the numbers of times of use, use times, and the like of a plurality screens in the auxiliary storage device 104 or the like as aggregate data. The processor 101 determines, based on the aggregate data, a screen, the number of times of use of which by the login user is the largest or the use time of which by the login user is the longest, as a frequently used screen relating to the login user.

The frequently used screen is an example of a third screen. Therefore, the processor 101 performs the processing in ACT 18 to function as a determining unit that determines, based on a predetermined reference, the third screen often used by the user. The number of times of use being the largest or the use time being the longest is the predetermined reference.

In ACT 19, the processor 101 generates a frequently used screen relating to the login user and displays the frequently used screen in the background.

Therefore, the processor 101 performs the processing in ACT 19 to function as an example of a display control unit that controls the touch panel 1071 to display, in the background, the screen often used by the login user.

In ACT 20, the processor 101 generates a screen displayed by the login user before the last logout and displays the screen in the background. "The screen displayed by the login user before the last logout" is hereinafter referred to as a "last screen." After the processing in ACT 20, the processor 101 returns to the waiting state in ACT 13 to ACT 15.

The last screen is an example of a fourth screen. Therefore, the processor 101 performs the processing in ACT 20 to function as an example of a display control unit that controls the touch panel 1071 to display the last screen in the background.

If an input other than the login operation and the clear operation is performed in the waiting state in ACT 13 to ACT 15, the processor 101 determines Yes in ACT 14 and proceeds to ACT 21.

In ACT 21 in FIG. 3, the processor 101 performs processing corresponding to the operation content in ACT 14.

In ACT 22, the processor 101 determines, according to the processing content in ACT 14 and the processing content in ACT 21, whether update of display content about the screen displayed in the foreground is necessary. If the update of the display content about the screen displayed in the foreground is unnecessary, the processor 101 determines No in ACT 22 and returns to the waiting state in ACT 13 to ACT 15. On the other hand, if the update of the display content about the screen displayed in the foreground is necessary, the processor 101 determines Yes in ACT 22 and proceeds to ACT 23.

In ACT 23, the processor 101 determines whether the screen about to be displayed in the foreground is similar to or the same as any one of screens displayed in the background. If the screen about to be displayed in the foreground is similar to or the same as any one of the screens displayed in the background, the processor 101 determines Yes in ACT 23 and proceeds to ACT 24.

In ACT 24, the processor 101 changes, from the background display to the foreground display, the screen displayed in the background similar to or the same as the screen about to be displayed in the foreground. For the change, for example, the processor 101 replaces the screen displayed in the foreground and the screen displayed in the background each other. Alternatively, the processor 101 ends the display of the screen displayed in the foreground and then displays, in the foreground, the screen displayed in the background. The screen, the display of which is changed from the background to the foreground, does not have to be the same as the screen about to be displayed in the foreground. If the screen, the display of which is changed from the background to the foreground, is not the same as the screen about to be displayed in the foreground, the processor 101 changes a different portion such that the screen, the display of which is changed from the background to the foreground, becomes the same as the screen about to be displayed in the foreground. The processor 101 may perform the change in a state of the background display or may perform the change after changing the background display to the foreground display.

Alternatively, the processor 101 may determine that the screen, the display of which is changed from the background to the foreground, has to be the same as the screen about to be displayed in the foreground.

For example, if the screen about to be displayed in the foreground is the frequently used screen relating to the login user, the processor 101 changes, from the background display to the foreground display, the frequently used screen displayed in the background. If the screen about to be displayed in the foreground is the last screen, the processor 101 changes, from the background display to the foreground display, the last screen displayed in the background. On the other hand, if the screen about to be displayed in the foreground is not similar to or the same as the screen displayed in the background, the processor 101 determines No in ACT 23 and proceeds to ACT 25.

In ACT 25, the processor 101 updates the display content of the foreground according to the operation content in ACT 14 and the processing content in ACT 21. For example, the processor 101 performs the update of the display content of the foreground in the same manner as the update by the image forming apparatus in the past (e.g., previously, etc.).

As explained above, the processor 101 performs the processing in ACT 25 and the like to function as an example of a display control unit that controls the touch panel 1071 to display a screen corresponding to input in the foreground. The screen corresponding to the input is an example of a first screen.

After the processing in ACT 24 or ACT 25, the processor 101 proceeds to ACT 26.

In ACT 26, the processor 101 predicts a screen to be displayed in the foreground next or subsequently. The screen predicted in ACT 26 is hereinafter referred to as a "predicted screen." For example, the processor 101 statistically predicts a screen highly likely to be displayed next or subsequently to a currently displayed screen and determines the screen as the predicted screen. Accordingly, the processor 101 aggregates, for example, the number of times of transition from a screen to another screen. Alternatively, the processor 101 predicts a screen to be displayed in the foreground next from data indicating which screen is highly likely to be displayed next to which screen. The data is stored in, for example, the auxiliary storage device 104. Alternatively, the processor 101 predicts a screen to be displayed in the foreground next using data defining which screen is determined as the predicted screen if a screen is currently displayed. The data is stored in, for example, the auxiliary storage device 104.

Consequently, the processor 101 performs the processing in ACT 26 to function as a predicting unit that predicts a screen to be used by the user. The predicted screen is an example of a fifth screen.

In ACT 27, the processor 101 determines whether to display the predicted screen predicted in the immediately preceding ACT 26 in the background. For example, if the predicted screen is a screen similar to or the same as a screen currently displayed in the background, it is unnecessary to display the predicted screen in the background anew. If the predicted screen is such a screen, the processor 101 determines not to display the predicted screen in the background. If displaying the predicted screen predicted in the immediately preceding ACT 26 in the background, the processor 101 determines Yes in ACT 27 and proceeds to ACT 28.

In ACT 28, the processor 101 displays the predicted screen predicted in the preceding ACT 26 in the background. The processor 101 performs the processing in ACT 28 to function as an example of a display control unit that controls the touch panel 1071 to display the predicted screen in the background. After the processing in ACT 28, the processor 101 proceeds to ACT 29. If the predicted screen predicted in the immediately preceding ACT 26 is not displayed in the background, the processor 101 determines No in ACT 27 and proceeds to ACT 29.

In ACT 29, the processor 101 determines whether to end display of anyone of the predicted screens displayed in the background. For example, the image forming apparatus 100 may store an upper limit of the number of predicted screens displayed in the background. In this case, if the number of predicted screens displayed in the background exceeds the upper limit, the processor 101 determines to end the display of any one or more of the predicted screens displayed in the background. If ending the display of any one of the predicted screens displayed in the background, the processor 101 determines Yes in ACT 29 and proceeds to ACT 30.

In ACT 30, for example, the processor 101 ends display of the predicted screen generated earliest, excluding the predicted screen that was predicted in the immediately preceding ACT 26 among the predicted screens displayed in the background.

After the processing in ACT 30, the processor 101 returns to the waiting state in ACT 13 to ACT 15 in FIG. 2. If not ending the display of any one of the predicted screens displayed in the background, the processor 101 determines No in ACT 29 in FIG. 3 and returns to the waiting state in ACT 13 to ACT 15 in FIG. 2. If determining to clear the operation information in the waiting state in ACT 13 to ACT 15, the processor 101 determines Yes in ACT 15 and proceeds to ACT 31.

In ACT 31, the processor 101 determines whether the image forming apparatus 100 is in a login state. If the image forming apparatus 100 is in the login state, the processor 101 determines Yes in ACT 31 and proceeds to ACT 27.

In ACT 32, the processor 101 correlates data about a screen currently displayed in the foreground with a login ID of the login user and stores the data in the auxiliary storage device 104 or the like. The screen is the last screen relating to the login user. The data includes information necessary for generating the screen currently displayed in the foreground as the last screen later.

Therefore, the auxiliary storage device 104 is an example of a storing unit that stores the last screen.

In ACT 33, the processor 101 performs logout processing for releasing the login state.

After the processing in ACT 33, the processor 101 proceeds to ACT 34. If the image forming apparatus 100 is not in the login state, the processor 101 determines No in ACT 31 and proceeds to ACT 34.

In ACT 34, the processor 101 displays, in the foreground, the home screen generated in ACT 12 and displayed in the background. Processing for displaying, in the foreground, a screen displayed in the background is the same processing as ACT 24.

In ACT 35, the processor 101 ends all the displays of the screens displayed in the background.

In ACT 36, the processor 101 clears the operation information. For example, the processor 101 clears the operation information in the same manner as the clearing by the image forming apparatus in the past. For example, the processor 101 erases, from the RAM 103, the auxiliary storage device 104, and the like, temporarily stored contents and the like among contents of operation by the operator. After the processing in ACT 36, the processor 101 returns to ACT 12.

Since the processor 101 returns to ACT 12 after the processing in ACT 36 as explained above, the processor 101 displays the home screen in the background even after displaying, in the foreground, the home screen displayed in the background. Therefore, the processor 101 performs the processing in ACT 34 to function as an example of a display control unit that controls the touch panel 1071 to display, in the foreground, the home screen displayed in the background. The processor 101 performs the processing in ACT 12 to function as an example of a display control unit that controls the touch panel 1071 to display the home screen in the background separately from the home screen displayed in the foreground. The image forming apparatus 100 in the embodiment displays the home screen in the background. If clearing the operation information of the user, the image forming apparatus 100 in the embodiment changes the home screen displayed in the background from the background display to the foreground display. By changing the home screen displayed in the background from the background display to the foreground display in this way, the image forming apparatus 100 in the embodiment can display the home screen in the foreground in a shorter time than generating the home screen anew. After changing the home screen displayed in the background from the background display to the foreground display, the image forming apparatus 100 in the embodiment displays the home screen anew in the background. Consequently, even if clearing the operation information of the user next, the image forming apparatus 100 in the embodiment can switch a screen displayed in the foreground to the home screen by changing the home screen displayed in the background from the background display to the foreground display. The image forming apparatus 100 in the embodiment displays, in the background, a screen often used by the user. If displaying a screen similar to or the same as the screen often used by the user, the image forming apparatus 100 in the embodiment displays, in the foreground, the screen often used by the user displayed in the background. Consequently, the image forming apparatus 100 in the embodiment can display the screen often used by the user in the foreground in a shorter time than generating the screen often used by the user anew.

The image forming apparatus 100 in the embodiment displays, in the background, the last screen displayed last time by the user. If displaying a screen similar to or the same as the last screen, the image forming apparatus 100 in the embodiment displays, in the foreground, the last screen displayed in the background. Consequently, the image forming apparatus 100 in the embodiment can display the last screen in the foreground in a shorter time than generating the last screen anew.

The image forming apparatus 100 in the embodiment estimates a predicted screen displayed next to a screen currently displayed on the touch panel 1071. The image forming apparatus 100 in the embodiment displays the predicted screen in the background. If displaying a screen similar to or the same as the predicted screen, the image forming apparatus 100 in the embodiment displays, in the foreground, the predicted screen displayed in the background. Consequently, the image forming apparatus 100 in the embodiment can display the predicted screen in the foreground in a shorter time than generating the predicted screen anew.

Modifications of the embodiment explained below are also possible. In the embodiment, if the login by the user is performed, the image forming apparatus 100 displays the frequently used screen relating to the user in the background. However, if the login by the user is not performed, the image forming apparatus 100 may display a frequently used screen relating to a non-login user in the background. For example, the processor 101 generates the frequently used screen about the non-login user and displays the frequently used screen in the background before or after the processing in ACT 12.

The processor 101 also stores, in the auxiliary storage device 104 or the like, the numbers of times of use or use times of screens for the non-login user as aggregate data, in the same manner as for the registered users. The processor 101 determines the frequently used screen relating to the non-login user based on the aggregate data.

In the embodiment, if the login by the user is performed, the image forming apparatus 100 displays the last screen in the background. However, if the login by the user is not performed, the image forming apparatus 100 may display, in the background, a screen displayed before the last clearing of operation information by the non-login user.

In the embodiment, the image forming apparatus 100 performs the generation of the screen displayed in the background up to a state in which the screen can be displayed on the touch panel 1071. However, the image forming apparatus 100 may retain the generation of the screen in a state in which the screen is generated halfway (e.g., partially, etc.). The screen in this case is also the screen displayed in the background. If the screen generated halfway is displayed in the background, the image forming apparatus 100 performs generation of the remaining part of the screen if displaying the screen in the foreground.

In the embodiment, the processor 101 determines the frequently used screen relating to the login user in ACT 18 in FIG. 2. However, the processor 101 may determine the frequently used screen of the login user during the processing in ACT 33 or the like and correlate determination content with the user ID of the login user and store the determination content in the auxiliary storage device 104 or the like. The processor 101 reads out the determination content based on the user ID of the login user during the processing in ACT 19 or the like. Further, the processor 101 generates the frequently used screen based on the determination content. Consequently, it is possible to reduce a time required from the login processing until the display of the frequently used screen.

In ACT 19 in FIG. 2 or the like, the processor 101 may generate two or more frequently used screens and display the frequently used screens in the background. As an example, if generating N frequently used screens, for example, the processor 101 generates, as the N frequently used screens, screens, the numbers of times of use of which by the login user are the largest to the N-th largest, or screens, use times of which by the login user are the longest to the N-th largest. N is an integer equal to or larger than 2. The numbers of times of use being the first to the N-th largest or the use times being the first to the N-th largest is an example of a predetermined reference.

The processor 101 may determine, as frequently used screens, all screens, the numbers of times of use of which are equal to or larger than a predetermined number of times, generate all the frequently used screens, and display the frequently used screens in the background. The numbers of times of use being equal to or larger than the predetermined number of times is an example of a predetermined reference.

Alternatively, the processor 101 may determine, as frequently used screens, all screens, use times of which are equal to or longer than a predetermined time, generate all the frequently used screens, and display the frequently used screens in the background. The use time being equal to or longer than the predetermined time is an example of a predetermined reference.

In ACT 28 or the like in FIG. 3, the processor 101 may generate two or more predicted screens and display the predicted screens in the background. As an example, if generating two predicted screens, the processor 101 generates, for example, a screen having the highest likelihood of being displayed and a screen having the second highest likelihood of being displayed.

If, in ACT 34 in FIG. 2, displaying, in the foreground, the home screen displayed in the background, the processor 101 may copy the home screen and display one of a copy source and a copy destination in the foreground. In this case, in ACT 35, the processor 101 ends all displays of screens excluding the copy source and the copy destination of the home screen among the screens displayed in the background. After the processing in ACT 36, the processor 101 returns to ACT 13. In this case, the processor 101 performs the processing in ACT 34 to function as an example of a display control unit that controls the touch panel 1071 to display, in the foreground, the home screen displayed in the background. The processor 101 performs the processing in ACT 34 to function as an example of a display control unit that controls the touch panel 1071 to display the home screen in the background separately from the home screen displayed in the foreground.

The processor 101 may realize, with a hardware configuration of a circuit, all or a part of the processing realized by the program in the embodiment.

For example, the image forming apparatus 100 is transferred to an administrator or the like of the image forming apparatus 100 in a state in which the program for executing the processing explained above is stored in the image forming apparatus 100. Alternatively, the image forming apparatus 100 is transferred to the administrator or the like in a state in which the program is not stored in the image forming apparatus 100. The program is separately transferred to the administrator or the like and stored in the image forming apparatus 100 based on operation by the administrator, a serviceperson, or the like. The transfer of the program at this time can be realized, for example, using a removable storage medium such as a disk medium or a semiconductor medium or by download via the Internet or a LAN.

The several embodiments are explained above. However, the embodiments are presented as examples and are not intended to limit the scope of the present disclosure. These new embodiments can be implemented in other various forms. Various omissions, substitutions, and changes can be made without departing from the spirit of the present disclosure. These embodiments and modifications of the embodiments are included in the scope and the gist of the present disclosure and included in the embodiments described in claims and the scope of equivalents of the embodiments.

What is claimed is:

1. An image forming apparatus for a display that is configured to display at least one of a foreground or a background, the image forming apparatus comprising:
   a display control unit configured to cause:
     the display to display, in the foreground, a first screen corresponding to a first input by a user,
     the display to display, in the background, a second screen corresponding to a home screen of the user, and
     in response to receiving a clear input from the user, the display to display, in the foreground, the second screen and display, in the background, the second screen separately from the second screen displayed in the foreground; and
   a determining unit that is configured to:
     determine a first duration that a third screen is displayed in the foreground,
     determine a second duration that a fourth screen is displayed in the foreground, and
     set the fourth screen as a frequently used screen in response to the second duration being greater than the first duration;
   wherein the display control unit is further configured to cause the display to display, in the background, the frequently used screen in response to detecting a login of the user.

2. The image forming apparatus of claim 1, further comprising a processor configured to determine, based on a predetermined reference, the fourth screen.

3. The image forming apparatus of claim 1, wherein the determining unit is further configured to:
   determine a first amount of times that the third screen is displayed in the foreground;
   determine a second amount of times that the fourth screen is displayed in the foreground; and
   set the fourth screen as the frequently used screen in response to the second amount of times being greater than the first amount of times.

4. The image forming apparatus of claim 1, further comprising a storage device configured to store the first screen after receiving a second input by the user;
   wherein the display control unit is further configured to cause:
     the display to display, in the foreground, a fifth screen corresponding to the second input by the user; and
     the display to display, in the background, the first screen after receiving the second input by the user.

5. The image forming apparatus of claim 1, further comprising a processor configured to predict a fifth screen associated with the user, wherein the display control unit is further configured to cause the display to display, in the background, the fifth screen.

6. A method for controlling an image forming apparatus having a display unit, the method comprising:
   displaying, in a foreground displayed by the display unit, a first screen corresponding to an input by a user;
   displaying, in a background displayed by the display unit and while displaying the first screen in the foreground, a second screen used as a home screen;
   after receiving a clear input from the user, displaying, in the foreground, the second screen and simultaneously displaying, in the background, the second screen separately from the second screen displayed in the foreground;
   determining a first duration that a third screen is displayed in the foreground;
   determining a second duration that a fourth screen is displayed in the foreground;
   setting the fourth screen as a frequently used screen in response to the second duration being greater than the first duration; and
   displaying, in the background, the frequently used screen in response to detecting a login of the user.

7. The method of claim 6, further comprising determining, based on a predetermined reference, the fourth screen.

8. The method of claim 6, further comprising:
   determining a first amount of times that the third screen is displayed in the foreground;
   determining a second amount of times that the fourth screen is displayed in the foreground; and
   setting the fourth screen as the frequently used screen in response to the second amount of times being greater than the first amount of times.

9. The method of claim 6, further comprising:
storing the first screen after receiving a second input by the user;
displaying, in the foreground, a fifth screen corresponding to the second input by the user; and
displaying, in the background, the first screen after receiving the second input by the user.

10. The method of claim 6, further comprising:
predicting a fifth screen associated with the user; and
displaying, in the background, the fifth screen.

11. A method for controlling an image forming apparatus having a processor and a display unit that is in electronic communication with the processor and configured to display screens in a foreground and to display screens in a background independent of the foreground, the method comprising:
causing, by the processor, the display unit to display a home screen in the foreground;
causing, by the processor, the display unit to display the home screen in the background while the home screen is displayed in the foreground;
detecting, by the processor, a login of a user;
causing, by the processor, the display unit to display a custom screen in the foreground instead of the home screen and while the home screen is displayed in the background, the custom screen associated with the user;
causing, by the processor, the display unit to display a first target screen in the foreground instead of the home screen;
determining, by the processor, a first duration that the first target screen is displayed in the foreground;
causing, by the processor, the display unit to display a second target screen in the foreground instead of the home screen and instead of the first target screen;
determining, by the processor, a second duration that the second target screen is displayed in the foreground; and
setting, by the processor, the second target screen as the custom screen in response to the second duration being greater than the first duration.

12. The method of claim 11, further comprising:
determining, by the processor, a first amount of times that the first target screen is displayed in the foreground;
determining, by the processor, a second amount of times that the second target screen is displayed in the foreground; and
setting, by the processor, the second target screen as the custom screen in response to the second amount of times being greater than the first amount of times.

13. The method of claim 11, further comprising:
causing, by the processor, the display unit to display a first background screen in the background;
causing, by the processor, the display unit to display a second background screen in the background while displaying the first background screen in the background; and
causing, by the processor, the display unit to display a foreground screen in the foreground while displaying the first background screen in the background and displaying the second background screen in the background.

14. The method of claim 13, further comprising:
detecting, by the processor, an operation input of the user;
determining, by the processor, the first target screen based on the operation input;
comparing, by the processor, the first target screen to the foreground screen, the first background screen, and the second background screen; and
causing, by the processor, the display unit to display the foreground screen in the foreground in response to the first target screen being similar to the foreground screen.

15. The method of claim 14, further comprising causing, by the processor, the display unit to display the first background screen in the foreground in response to the first target screen being similar to the first background screen.

16. The method of claim 15, further comprising causing, by the processor, the display unit to display the second background screen in the foreground in response to the first target screen being similar to the second background screen.

17. The method of claim 11, further comprising:
causing, by the processor, the display unit to display a first foreground screen in the foreground; and
causing, by the processor, the display unit to display a second foreground screen in the foreground instead of the first foreground screen.

18. The method of claim 17, further comprising causing, by the processor, the display unit to display the first foreground screen in the background after causing the display unit to display the second foreground screen in the foreground.

19. The method of claim 11, further comprising:
causing, by the processor, the display unit to display a first foreground screen in the foreground;
receiving, by the processor, a clear input from the user while causing the display unit to display the first foreground screen in the foreground; and
storing, by the processor, data associated with the first foreground screen and a user identifier associated with the user, after receiving the clear input.

20. The method of claim 19, further comprising causing, by the processor, the display unit to display the first target screen in the foreground instead of the first foreground screen, after storing the data.

* * * * *